US007076000B2

(12) United States Patent
Rodriguez

(10) Patent No.: US 7,076,000 B2
(45) Date of Patent: Jul. 11, 2006

(54) SOFT-DECISION METRIC GENERATION FOR HIGHER ORDER MODULATION

(75) Inventor: Michael J. Rodriguez, Arlington Heights, IL (US)

(73) Assignee: Motorola, Inc., Schaumberg, IL (US)

( * ) Notice: Subject to any disclaimer, the term of this patent is extended or adjusted under 35 U.S.C. 154(b) by 649 days.

(21) Appl. No.: 09/765,857

(22) Filed: Jan. 18, 2001

(65) Prior Publication Data

US 2002/0131515 A1     Sep. 19, 2002

(51) Int. Cl.
*H04L 5/12* (2006.01)
*H03D 1/00* (2006.01)
*H03M 13/03* (2006.01)

(52) U.S. Cl. ............ 375/262; 375/265; 375/340; 714/780; 714/794

(58) Field of Classification Search .............. 375/262, 375/130, 134, 137, 140, 145, 265, 340, 341; 714/794, 795, 796, 780
See application file for complete search history.

(56) References Cited

U.S. PATENT DOCUMENTS

| 6,510,536 B1 * | 1/2003 | Crozier et al. ............... 714/755 |
| 6,594,318 B1 * | 7/2003 | Sindhushayana ............ 375/262 |
| 6,760,390 B1 * | 7/2004 | Desai et al. ................. 375/341 |
| 6,829,313 B1 * | 12/2004 | Xu ................................ 375/341 |
| 2003/0018941 A1 * | 1/2003 | Miyata et al. ............... 714/780 |
| 2004/0261000 A1 * | 12/2004 | Hewitt et al. ............... 714/781 |

OTHER PUBLICATIONS

Fuyun Ling "Optimal Turbo Decoding Metric Generation in a Pilot Assisted Coherent Wireless Communication System" IEEE VTC 2000, Sep. 24-28, 2000, vol. 1, pp. 298-302.*
Le Goff et al., "Turbo-Codes and High Spectral Efficiency Modulation", IEEE International Conference on Communications, 1994. ICC '94, SUPERCOMM/ICC '94, vol. 2, pp. 645-649.

* cited by examiner

*Primary Examiner*—Young T. Tse
(74) *Attorney, Agent, or Firm*—Brian M Mancini; Randall S. Vaas

(57) ABSTRACT

A method (100) for simplifying soft-decision metric decisions in a M-ary modulation system includes determining (102) a single function for a soft-decision metric for each bit in a symbol by restricting the set of all possible Gray-coded constellation points to those closest to a boundary between a bit value of 0 and 1 for each bit in the input symbol and applying a predetermined function corresponding to the range of restricted constellation points to the entire possible range of symbols. A next step includes inputting (104) a symbol having real part, x, and an imaginary part, y. A next step includes (106) setting a soft-decision metric for each bit in the symbol using the predetermined function from the determining step (102).

8 Claims, 9 Drawing Sheets

-PRIOR ART-

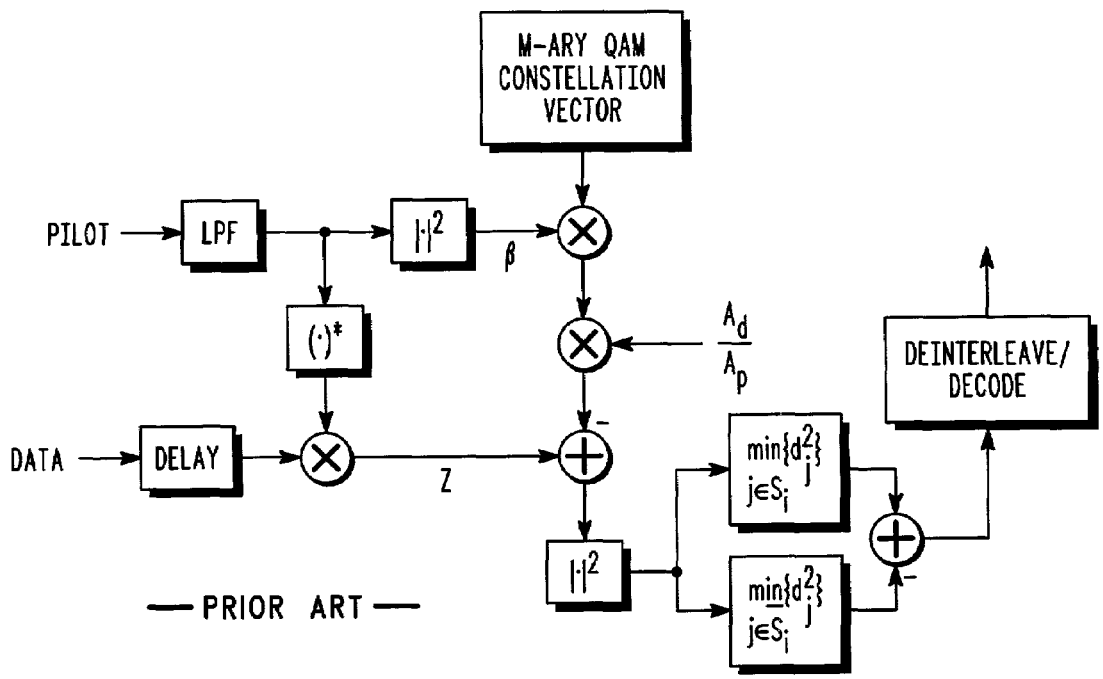
FIG.7 —PRIOR ART—
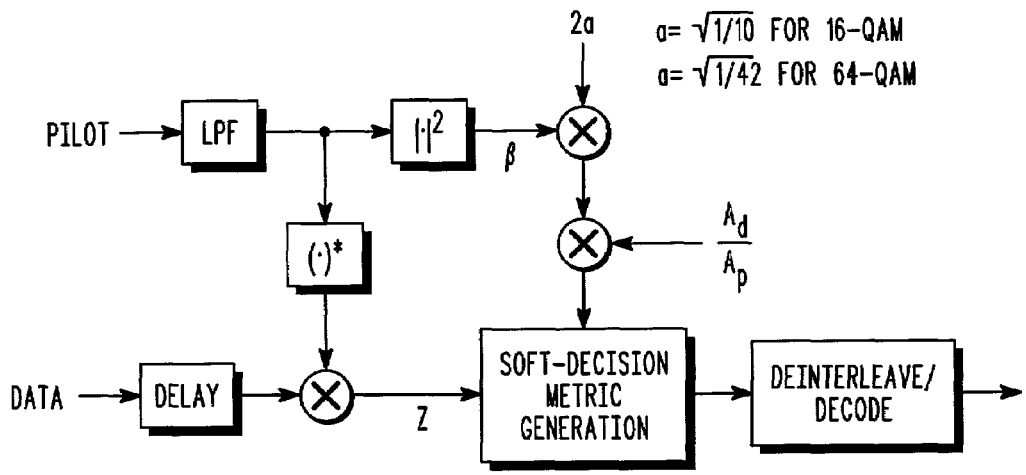
FIG.8

SOFT-DECISION METRIC GENERATION FOR HIGHER ORDER MODULATION

FIELD OF THE INVENTION

This invention relates generally to communication systems, and more particularly to a soft output decoder for use in a receiver of a convolutional code communication system.

BACKGROUND OF THE INVENTION

Convolutional code are often used in digital communication systems to protect transmitted information from error. Turbo codes have been developed for various communications systems, such as Direct Sequence Code Division Multiple Access (DS-CDMA) standard IS-95 and Global System for Mobile Communications (GSM), that outperform conventional coding techniques. Turbo coding is efficiently utilized to correct errors in the case of communicating over an added white Gaussian noise (AWGN) channel and a Rayleigh fading channel.

Turbo codes are generally composed of two or more convolutional codes and turbo interleavers. Turbo decoding is iterative and uses a soft output decoder to decode the individual convolutional codes. Soft-decision decoding provides a significant increase in coding gain, with a minimal increase in complexity, relative to hard-decision decoding. The soft output decoder provides information on each bit position which helps the soft output decoder decode the convolutional codes. The soft output decoder is usually a MAP (maximum a posteriori) or soft output Viterbi algorithm (SOVA) decoder which requires backward and forward recursion decoding to determine the soft output over the block as is known in the art.

Typically, a transmitted outgoing code vector is described using a trellis coded modulation. At the receiver, a practical soft-decision decoder, such as a Viterbi decoder as is known in the art, uses the trellis structure to perform an optimum search for the maximum likelihood transmitted code vector. This is accomplished by determining a log-likelihood ratio (LLR) for each bit, as is known in the art. For binary phase shift keying (BPSK or 2-PSK) modulation, generation of the soft-decision metric is relatively simple, in that, since the log-likelihood ratio is linear, the received symbol is used as the soft-decision metric. Similarly, for quadrature phase shift keying (QPSK or 4-PSK) modulation, the LLR for each bit is also linear, so the real and imaginary parts of a received symbol are used as the soft-decision metrics. However, for higher order, M-ary modulations such as 8-PSK or quadrature amplitude modulation (QAM) constellations such as 16-QAM and 64-QAM where amplitude distortion becomes a problem, the LLR is more complicated.

One prior art method for generating a soft decision metric for a bit i in a $\log_2(M)$ bit symbol calculates: (a) the squared Euclidean distance between the received symbol and the nearest constellation point where bit i equals 1, (b) the squared Euclidean distance between the received symbol and the nearest constellation point where bit i equals 0, and (c) the difference between these two squared distances. For each of the $\log_2(M)$ bits per symbol, this requires the computation of M squared distances, plus the determination of the two minima in the M-point set, plus one subtraction. As a result, approximately $M*\log_2(M)$ operations per modulation symbol are required. Clearly, as M increases, the computational complexity increases much faster than any additional throughput achieved by using more bits per symbol. Moreover, this implementation requires a significant amount of memory and processing power.

There is a need to simplify the calculation of LLR so that using higher order modulations does not require a significant increase in complexity relative to BPSK/QPSK systems. In particular, it is desirable to save calculation time and circuit power. It would also be beneficial to provide this improvement without sacrificing performance.

BRIEF DESCRIPTION OF THE DRAWINGS

FIG. 7 shows a block diagram showing fading compensation with the prior art dual-minima soft-decision metric generation;

FIG. 8 shows a block diagram showing fading compensation with the simplified soft-decision metric generation, in accordance with the present invention;

DETAILED DESCRIPTION OF THE PREFERRED EMBODIMENT

The present invention takes advantage of the properties of Gray coding, as well as considering a reduced set of constellation points when deriving the LLR, to provide a simplified method of generating soft-decision metrics. In addition, the present invention eliminates the need for the calculation of M squared distances as well as the determination of two minima. Advantageously, only a few simple operations are needed to generate the soft-decision metric. In particular, approximately $\log_2(M)$ operations are needed per symbol. Moreover, this simplification is achieved with virtually no decrease in bit-error rate performance.

As is known in the art, turbo decoder error correcting performance depends on observation of a magnitude of log-likelihood ratio (LLR) for each information bit in the iterative portion of the decoder. LLR increases as iterations go on, improving the probability of the correct output decisions. The LLR magnitude increase is directly related to the quality of the incoming signal and the resulting number of errors incurred therein. In other words, the LLR magnitude is related to channel conditions, where a noisier environment will need more iterations to correctly resolve the information bits and reduce error. The principles of providing hard and soft output decisions are known in the art.

Figure 1:
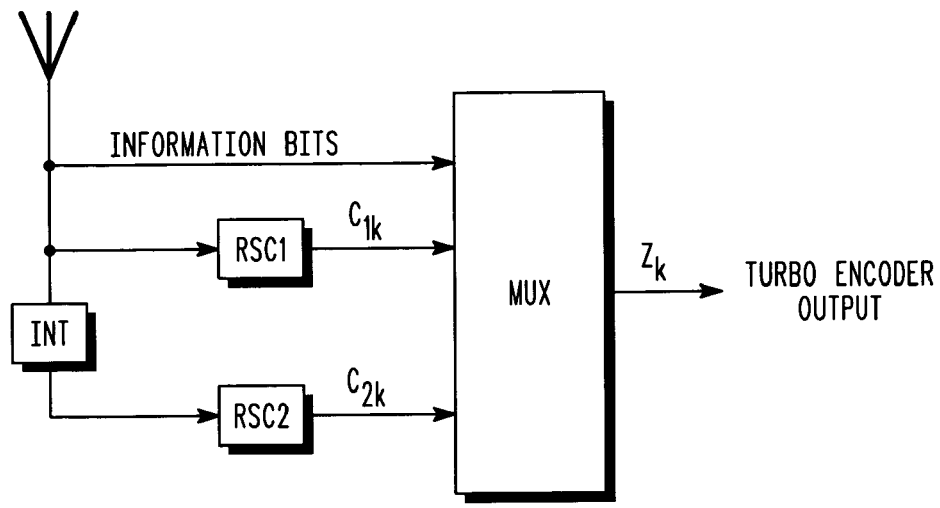
FIG. 1 shows a typical prior art turbo encoding scheme.

FIG. 1 shows a typical turbo coder constructed with interleavers and constituent codes which are usually systematic convolutional codes. In general, a turbo coder is a parallel concatenation of two recursive systemic convolutional encoders (RSC1, RSC2) with an interleaver (INT) between them. The output of the turbo encoding is generated by multiplexing (concatenating) the information bits and the code bits $c_{1k}$, $c_{2k}$ from the two encoders, RSC1 and RSC2. This generates an information throughput of 1/3. Optionally, the code bits can be punctured as is known in the art to increase code rate (e.g., a throughput of 1/2). The turbo encoded signal $z_k$ is then transmitted over a channel. Noise due to the AWGN nature of the channel becomes added to the signal during transmission. The noise variance of the AWGN can be expressed as $\sigma^2 = N_0/2$, where $N_0/2$ is the two sided noise power spectrum density. The noise increases the likelihood of bit errors when a receiver attempts to decode the input signal, $z_k$, to obtain the original information bits. In addition, the signal is subject to Rayleigh fading. The use of the interleaver (INT) attempts to alleviate fading conditions.

Assuming all transmitted symbols $c_j$ are equally likely, the LLR for bit i, given the received symbol $z=x+jy$, is given by $$\Lambda^{(i)}(z) \equiv \log\left(\frac{p_0(z)}{p_1(z)}\right) = \log\left(\frac{\sum_{j \in S_i} \exp\left(-\frac{1}{2\sigma^2}|z-c_j|^2\right)}{\sum_{j \in \overline{S_i}} \exp\left(-\frac{1}{2\sigma^2}|z-c_j|^2\right)}\right), \quad (1)$$

where $S_i$ is the set of constellation points where bit i equals 1, and $\overline{S_i}$ is the set of constellation points where bit i equals 0. Ideally, Eq. 1 would be used to compute the soft decision metrics, since it is optimal. However, it cannot be easily simplified, and thus is not a realistic option.

A sub-optimal version of Eq. 1 can be obtained by taking the limit for high signal-to-noise ratio (SNR). For high SNR, the summations in the numerator and denominator of Eq. 1 are dominated by their largest term, i.e. the one which minimizes $|z-c_j|^2$. Replacing the summations in Eq. 1 by their largest terms, the LLR can be approximated by the equation $$\Lambda^{(i)}(z) = K\left[\min_{j \in S_i}\{d_j^2\} - \min_{j \in \overline{S_i}}\{d_j^2\}\right], \quad i = 0, 1, 2, \ldots, \log_2 M - 1, \quad (2)$$

where $d_j^2$ represents the squared Euclidean distance between z and the constellation point j, and K is a gain factor. Therefore, given a received symbol z, the soft-decision metric for bit i is calculated by taking the squared Euclidean distance between z and the nearest constellation point where bit i equals 1, then subtracting the squared Euclidean distance between z and the nearest constellation point where bit i equals 0.

Figure 2:
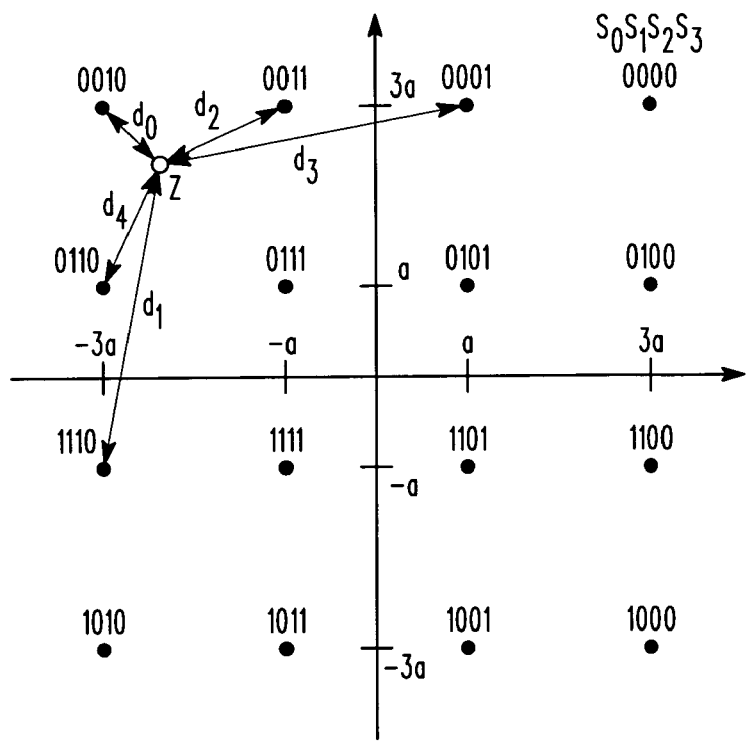
FIG. 2 shows a constellation diagram for a 16-QAM signal showing a portion of a soft-decision metric calculations, in accordance with the present invention.

An example for the 16-QAM constellation is shown in FIG. 2. The soft-decision metrics for each of the four bits are given by $$\Lambda = \begin{bmatrix} \Lambda^{(0)} \\ \Lambda^{(1)} \\ \Lambda^{(2)} \\ \Lambda^{(3)} \end{bmatrix} = \begin{bmatrix} K(d_1^2 - d_0^2) \\ K(d_4^2 - d_0^2) \\ K(d_0^2 - d_3^2) \\ K(d_2^2 - d_0^2) \end{bmatrix},$$

where the Euclidean distances $d_i$ are shown. For example, for the first bit, the closest constellation point to point z having a first bit of 0 is represented by path $d_0$. The closest constellation point to point z having a first bit of 1 is represented by path $d_1$.

The obvious method for calculating the soft-decision metrics requires calculating the squared Euclidean distance between z and each of the M constellation points, as well as determining two minima, each over an M/2 point set, for each bit. Clearly, this would result in an excessive computational burden. Denoting $c_{i,0}$ and $c_{i,1}$ as the closest constellation point where bit i equals 0 and 1, respectively, the soft-decision metrics given by Eq. 2 can now be written as $$\Lambda^{(i)}(z) = K[|z-c_{i,1}|^2 - |z-c_{i,0}|^2]. \quad (3)$$

Fortunately, due to the properties of Gray coding, the receiver can determine $c_{i,0}$ and $c_{i,1}$ based on z, without having to calculate the squared Euclidean distance between z and the M constellation points.

Figure 3:
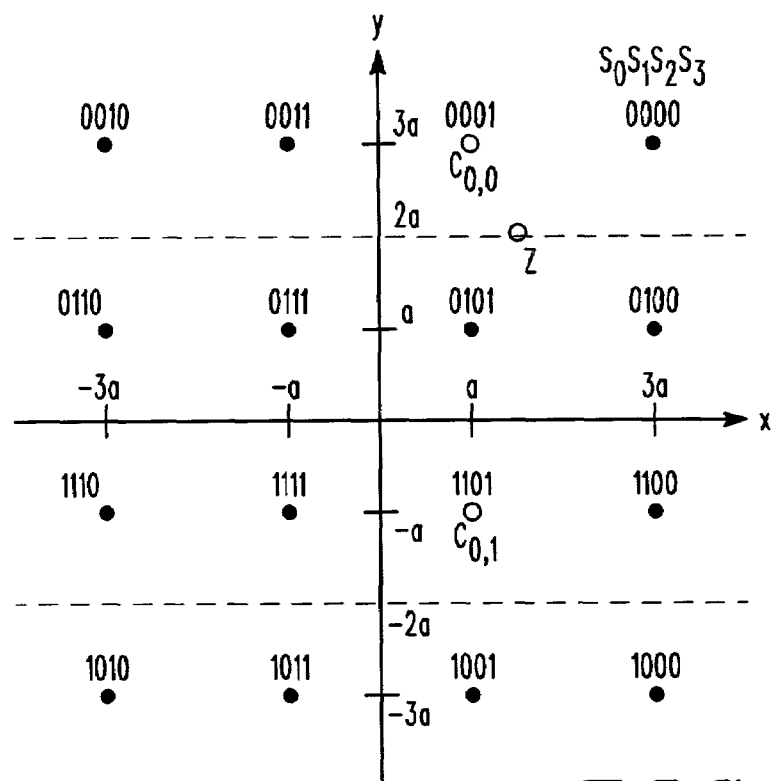
FIG. 3 shows a constellation diagram showing the soft-decision metric calculation for bit 0 of a for a 16-QAM signal, in accordance with the present invention.

First consider the soft-decision metric for the first bit (bit 0) of a 16-QAM symbol as shown in FIG. 3, assuming that z=x+jy was the received symbol. There are three cases to consider: y>2a, −2a<y<2a, and y<2a. For example, if z has an imaginary value, y, that is greater than 2a than the closest constellation point having a first bit of 0 will be the 0001 point. If z had been slightly less than 2a then the closest constellation point having a first bit of 0 would have been different, i.e. the 0101 point. Therefore, the line y=2a (and correspondingly y=−2a) form a decision boundary, When y>2a as shown, $c_{0,0}=x_0+j3a$, while $c_{0,1}=x_0-ja$. Note that the real part of $c_{0,0}$ and $c_{0,1}$ is the same, denoted by $x_0$. In other words, all the constellation points across each row in the constellation have the same first bit, so it is nor important to determine the x location of z. As a result, the soft-decision metric for bit 0 will only be a function of y. This is due to the square constellation and the properties of the Gray coding. In fact, all of the soft-decision symbols for both 16-QAM and 64-QAM will exhibit this behavior; they will either be a function of x or y, but not both.

Substituting $c_{0,0}$ and $c_{0,1}$ into Eq. 3, $$\Lambda^{(0)} = K[|z-c_{0,1}|^2 - |z-c_{0,0}|^2]$$
$$= K[(x-x_0)^2 + (y+a)^2 - (x-x_0)^2 - (y-3a)^2]$$
$$= K[8ay - 8a^2]$$

In the second case, when −2a<y<2a, $c_{0,0}=x_1+ja$ and $c_{0,1}=x_1-ja$. Substituting into Eq. 3 gives $$\Lambda^{(0)} = K[|z - c_{0,1}|^2 - |z - c_{0,0}|^2]$$
$$= K[(x - x_1)^2 + (y + a)^2 - (x - x_1)^2 - (y - a)^2]$$
$$= K[4ay]$$

Finally, when $y < -2a$, $c_{0,0} = x_2 + ja$ and $c_{0,1} = x_2 - j3a$. Substituting into Eq. 3 yields $$\Lambda^{(0)} = K[|z - c_{0,1}|^2 - |z - c_{0,0}|^2]$$
$$= K[(x - x_2)^2 + (y + 3a)^2 - (x - x_2)^2 - (y - a)^2]$$
$$= K[8ay + 8a^2].$$

Combining these three cases into a piecewise continuous function and setting $K = 1/4a$ results in the equation $$\Lambda^{(0)} = \begin{cases} 2(y - a) & y > 2a \\ y & -2a < y < 2a \\ 2(y + a) & y < -2a \end{cases}$$

for the soft-decision metric for bit 0.

Calculation of the soft-decision metric for the second bit (bit 1) is similar, but with different boundaries. Here there are two possible cases, one for $y > 0$ and one for $y < 0$. When $y > 0$, $c_{1,0} = x_3 + j3a$ and $c_{1,1} = x_3 + ja$.

Substituting into Eq. 3, $$\Lambda^{(1)} = K[|z - c_{1,1}|^2 - |z - c_{1,0}|^2]$$
$$= K[(x - x_3)^2 + (y - a)^2 - (x - x_3)^2 - (y - 3a)^2]$$
$$= K[4ay - 8a^2]$$

Similarly, when $y < 0$, $\Lambda^{(1)} = K[-4ay - 8a^2]$. Setting $K = 1/4a$ and using the absolute value of $y$, these two cases can be combined into $$\Lambda^{(1)} = |y| - 2a.$$

The soft-decision symbols for the third and fourth bits (bits 2 and 3) follow the same format as those for bits 0 and 1, only now they are a function of the real part of the received symbol and have corresponding vertical boundaries. The soft-decision symbols for bits 2 and 3 are thus given by the equations $$\Lambda^{(2)} = \begin{cases} 2(x - a) & x > 2a \\ x & -2a < x < 2a \\ 2(x + a) & x < -2a \end{cases}$$

and $$\Lambda^{(3)} = |x| - 2a.$$

Calculation of the soft-decision symbols for 64-QAM is somewhat more complicated, since there are now 6 bits per symbol instead of 4. However, they can still be calculated using Eq. 3 as was done for 16-QAM, resulting in the following equations:

$$\Lambda^{(0)} = \begin{cases} 4(y - 3a) & y > 6a \\ 3(y - 2a) & 4a < y < 6a \\ 2(y - a) & 2a < y < 4a \\ y & -2a < y < 2a \\ 2(y + a) & -4a < y < -2a \\ 3(y + 2a) & -6a < y < -4a \\ 4(y + 3a) & y < -6a \end{cases}$$

$$\Lambda^{(1)} = \begin{cases} 2(|y| - 5a) & |y| > 6a \\ |y| - 4a & 2a < |y| < 6a \\ 2(|y| - 3a) & |y| < 2a \end{cases}$$

$$\Lambda^{(2)} = ||y| - 4a| - 2a$$

$$\Lambda^{(3)} = \begin{cases} 4(x - 3a) & x > 6a \\ 3(x - 2a) & 4a < x < 6a \\ 2(x - a) & 2a < x < 4a \\ x & -2a < x < 2a \\ 2(x + a) & -4a < x < -2a \\ 3(x + 2a) & -6a < x < -4a \\ 4(x + 3a) & x < -6a \end{cases}$$

$$\Lambda^{(4)} = \begin{cases} 2(|x| - 5a) & |x| > 6a \\ |x| - 4a & 2a < |x| < 6a \\ 2(|x| - 3a) & |x| < 2a \end{cases}$$

$$\Lambda^{(5)} = ||x| - 4a| - 2a.$$

Figure 4:
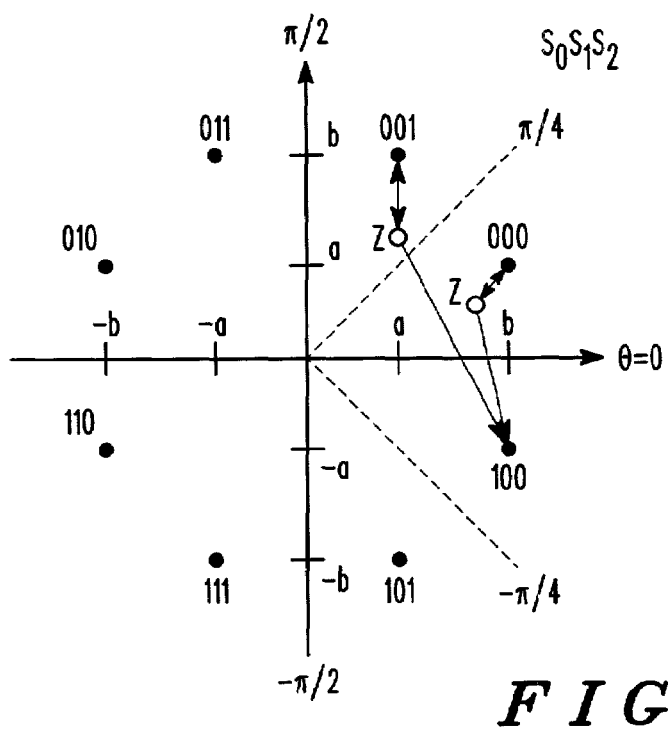
FIG. 4 shows a constellation diagram for an 8-PSK signal showing the soft-decision metric calculation for bits 0 and 1, in accordance with the present invention.

The soft-decision symbols for 8-PSK can be calculated in much the same way as for QAM. However, in accordance with the present invention and as shown in FIG. 4, it is beneficial to observe radial boundaries in 8-PSK instead of orthogonal boundaries. Shifting the phase of the received symbol by multiplying by $e^{j\pi/8}$ helps simplify the process.

For the first and second bits (bits 0 and 1), there are two main cases to consider: when $c_{i,0}$ and $c_{i,1}$ are separated by $\pi/4$ radians and when they are separated by $\pi/2$ radians. To illustrate the first case, the soft-decision metric for bit 0 will be calculated for a received symbol of $z = x + jy = Ae^{j\theta}$, where $0 \leq \theta < \pi/4$ as shown (and correspondingly for $-\pi/4 < \theta \leq 0$ not shown). Define $a \equiv \sin(\pi/8)$ and $b \equiv \cos(\pi/8)$. The constellation points can now be expressed in terms of $a$ and $b$. In this case, $c_{0,0} = b + ja$ and $c_{0,1} = b - ja$, where $c_{0,0}$ and $c_{0,1}$ are separated by $\pi/4$ radians. Substituting $z$ into Eq. 3, $$\Lambda^{(0)} = K[|z - c_{0,1}|^2 - |z - c_{0,0}|^2]$$
$$= K[(x - b)^2 + (y + a)^2 - (x - b)^2 - (y - a)^2]$$
$$= K[4ay]$$

The second case can be illustrated by calculating the soft-decision metric for bit 0, given a received symbol having $\pi/4 \leq \theta < \pi/2$. In this case, $c_{0,0} = a + jb$ and $c_{0,1} = b - ja$, where $c_{0,0}$ and $c_{0,1}$ are separated by $\pi/2$ radians. Substituting into Eq. 3, $$\Lambda^{(0)} = K[|z - c_{0,1}|^2 - |z - c_{0,0}|^2]$$
$$= K[(x-b)^2 + (y+a)^2 - (x-a)^2 - (y-b)^2]$$
$$= K[y(2a+2b) - x(2b-2a)].$$

For different θ, the expression for the soft-decision metric for bit 0 will always take one of these two forms, although there may be sign differences. Combining the expressions for all possible ranges of θ and setting K=1/4a, the equation for the soft-decision metric for bit 0 can be written as $$\Lambda^{(0)} = \begin{cases} y\left(1 + \frac{1}{\sqrt{2}}\right) - |x|\frac{1}{\sqrt{2}} & y > 0, |y| > |x| \\ y\left(1 + \frac{1}{\sqrt{2}}\right) + |x|\frac{1}{\sqrt{2}} & y < 0, |y| > |x| \\ y & |y| < |x| \end{cases}.$$

For bit 1, the equation is the same as above, except that x and y are swapped (i.e. a π/2 bit rotation):

$$\Lambda^{(1)} = \begin{cases} x\left(1 + \frac{1}{\sqrt{2}}\right) - |y|\frac{1}{\sqrt{2}} & x > 0, |x| > |y| \\ x\left(1 + \frac{1}{\sqrt{2}}\right) + |y|\frac{1}{\sqrt{2}} & x < 0, |x| > |y| \\ x & |x| < |y| \end{cases}.$$

For bit 2, the expression for the soft-decision metric has only one form, where when $c_{2,0}$ and $c_{2,1}$ are separated by π/4 radians, which can be illustrated by substituting $c_{2,0}$=a+jb and $c_{2,1}$=b+ja into Eq. 3 to obtain $$\Lambda^{(2)} = K[|z - c_{2,1}|^2 - |z - c_{2,0}|^2]$$
$$= K[(x-b)^2 + (y-a)^2 - (x-a)^2 - (y-b)^2]$$
$$= K[y(2b-2a) - x(2b-2a)].$$

This equation can be modified to account for all cases of z, resulting in $$\Lambda^{(2)} = (|x| - |y|)\frac{1}{\sqrt{2}}.$$

The equations given in the previous sections demonstrate that soft-decision metrics can be generated without calculating and searching through the squared distances between z and M constellation points. Ideally, however, the soft-decision metrics would be generated by a single function for all values of z, rather that a piecewise continuous function. This can be accomplished by restricting the set of constellation points in Eq. 2 to those which are closest to the boundary between a bit value of 0 and 1 (0/1 boundary) in the x-y plane. $S_i$ then becomes the set of constellation points closest to the 0/1 boundary where bit i equals 1, while $\overline{S_i}$ is the set of constellation points closest to the 0/1 boundary where bit i equals 0. This is equivalent to taking the equations derived in the previous sections and only using the cases which contain the 0/1 boundaries in the x-y plane. In other words, the soft-decision metric generated for any symbol is defined by the difference between the squares of the distances between the restricted constellation points having 0 and 1 bit values closest to the 0/1 boundary and a hypothetical symbol falling within that range of restricted constellation points. In particular, the soft metric determined for a hypothetical symbol falling within the restricted range is attributed to any possible symbol value in the constellation.

For example, consider bit 0 of a 16-QAM symbol. The soft-decision metric for this bit was given by $$\Lambda^{(0)} = \begin{cases} 2(y-a) & y > 2a \\ y & -2a < y < 2a \\ 2(y+a) & y < -2a \end{cases}.$$

The 0/1 boundary occurs along y=0, so only use the case that encompasses this boundary, i.e. where -2a<y<2a is the restricted range. In this case, $\Lambda^{(0)}$=y. Similarly, $\Lambda^{(2)}$=x. The second and fourth bits (bits 1 and 3) have two 0/1 boundaries. However, these bits have previously been expressed as a single function and therefore remain so since there is no possible further simplification, i.e. $\Lambda^{(1)}$=|y|−2a and $\Lambda^{(3)}$=|x|−2a.

A 64-QAM symbol can be similarly considered. For bit 0, the 0/1 boundary occurs along y=0, and the case that encompasses this boundary, -2a<y<2a, results in $\Lambda^{(o)}$=y. Similarly, $\Lambda^{(3)}$=x. For bit 1, the 0/1 boundary occurs at |y|=4a. The case where z lies between 2a <|y|<6a contains this boundary, so the soft-decision metric is given by $\Lambda^{(1)}$=|y|−4a. Similarly, $\Lambda^{(4)}$=|x|−4a. The third and sixth bits (bits 2 and 5) have multiple boundaries. However, these bits have previously been expressed as a single function and therefore remain so since there is no further simplification available.

Using this technique, the complete simplified soft-decision metrics for 64-QAM, 16-QAM, and 8-PSK respectively are $$\Lambda = \begin{bmatrix} y \\ |y| - 4a \\ ||y|-4a| - 2a \\ x \\ |x| - 4a \\ ||x|-4a| - 2a \end{bmatrix}$$

$$\Lambda = \begin{bmatrix} y \\ |y| - 2a \\ x \\ |x| - 2a \end{bmatrix}$$

$$\Lambda = \begin{bmatrix} y \\ x \\ (|x| - |y|)\frac{1}{\sqrt{2}} \end{bmatrix}.$$

The advantage of the 8-PSK method, as described above in accordance with the present invention, is that scaling is not required to improve performance inasmuch as radial boundaries are utilized, i.e. there is no "a" value in the metric. As a result, the radial analysis eliminates additional scaling calculations and complexity.

EXAMPLE

Figure 5:
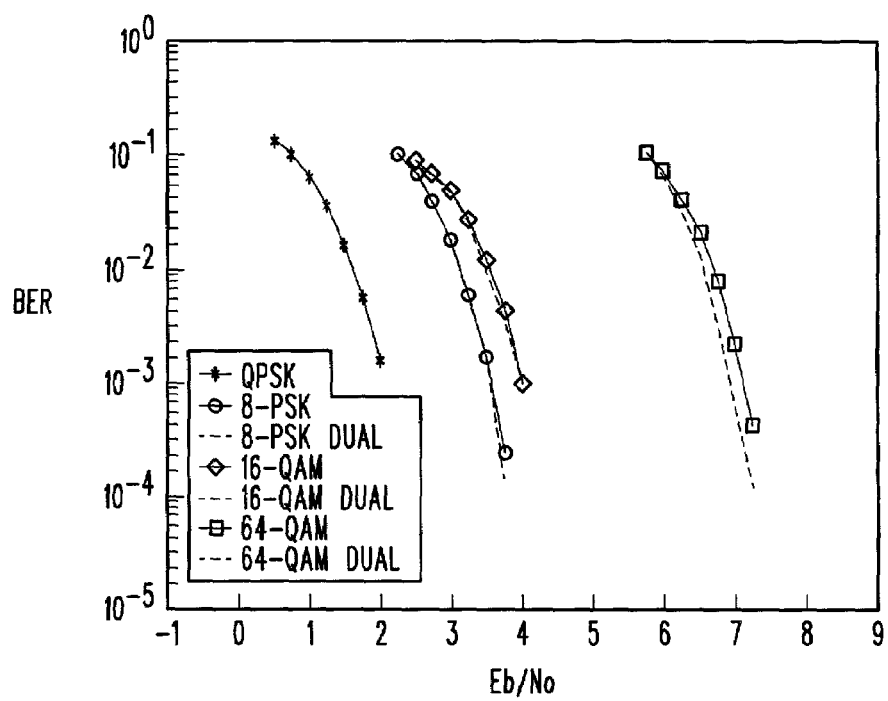
FIG. 5 shows a graphical representation comparing the AWGN performance of the present invention to the prior art.
Figure 6:
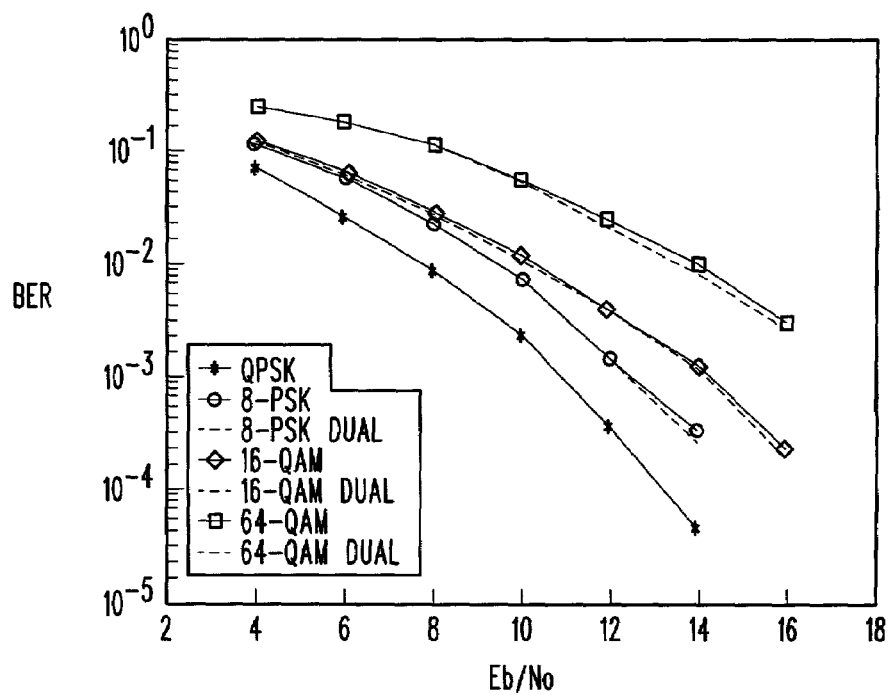
FIG. 6 shows a graphical representation comparing the fading channel performance of the present invention to the prior art.

FIGS. 5 and 6 show simulation results using simplified decoding in accordance with the present invention. The performance results were verified through numerical simulations. Simulation was done to compare the performance of the soft-decision metrics generated by the dual minima method in Eq. 3 to those generated according to the simplified equations in accordance with the present invention. Bit error rate was simulated for an AWGN channel and for single-path Rayleigh fading at 100 km/h. In each case, R=1/2 Turbo coding was used and the block sizes were as follows in Table 1.

TABLE 1

Block size used per modulation scheme

| Scheme | Code Rate | Modulation | Block Size |
|--------|-----------|------------|------------|
| 1 | 1/2 | QPSK | 768 |
| 3 | 1/2 | 8-PSK | 1152 |
| 5 | 1/2 | 16-QAM | 1536 |
| 7 | 1/2 | 64-QAM | 2304 |

The results for the AWGN channel are summarized below in FIG. 5. The dashed lines represent the bit-error rate (BER) when the soft-decision metrics are calculated using Eq. 3, while the solid lines represent the BER when soft-decision metrics are calculated using the simplified decoding in accordance with the present invention. $E_b$ is the energy per bit and $N_0$ is the noise power spectrum density. Note that there is virtually no decrease in performance for 8-PSK and 16-QAM when using the simplified method for generating the soft-decision metrics, while 64-QAM shows a degradation of approximately 0.2 dB.

FIG. 6 illustrates the 100 km/h Rayleigh fading simulation. Once again, there is virtually no decrease in performance for 8-PSK and 16-QAM when using the simplified method for generating the soft-decision metrics, while 64-QAM shows a degradation of approximately 0.25 dB. These modulation types show virtually no performance degradation with the simplified soft-decision metrics.

In operation, when utilizing QAM modulation, the receiver must account for variations in the signal amplitude due to fading and changes in the data channel power. For dual-minima soft-decision metric generation, the receiver can compensate for this by scaling the reference constellation by $\beta A_d/A_p$, where $\beta$ is the squared magnitude of the filtered pilot, and $A_d$ and $A_p$ are the data and pilot gains of the communication channel, respectively. This is illustrated below in FIG. 7.

Figure 9:
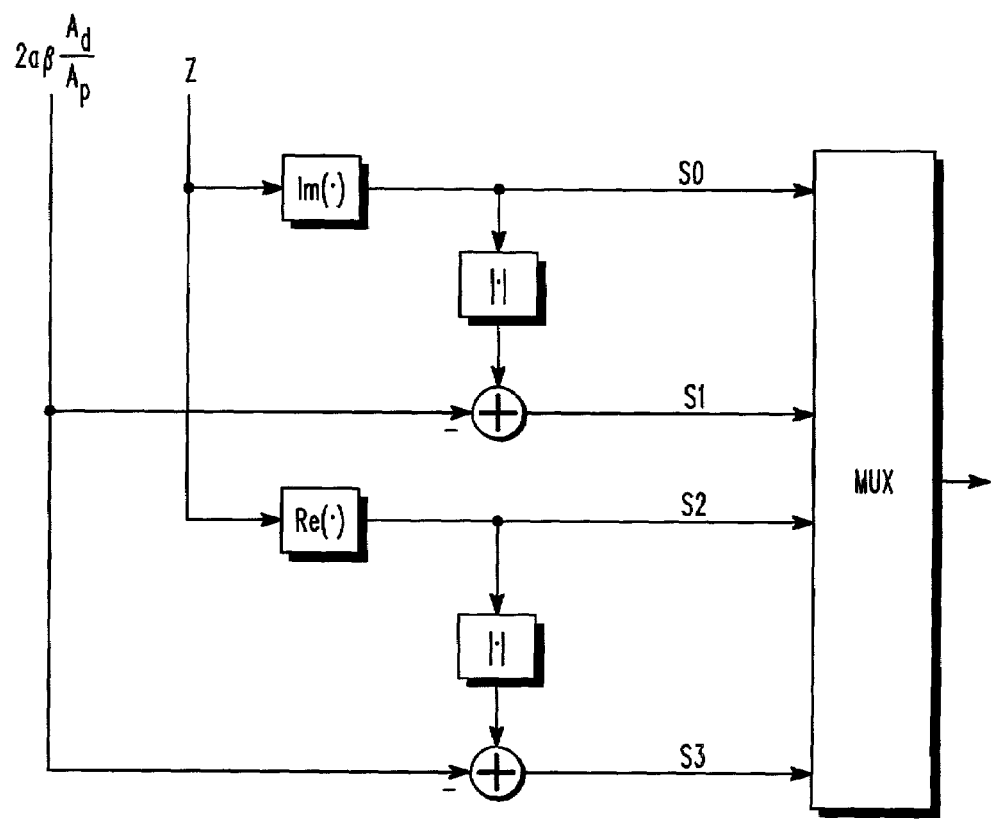
FIG. 9 shows a block diagram showing the simplified soft-decision metric generation for 16-QAM, in accordance with the present invention.
Figure 10:
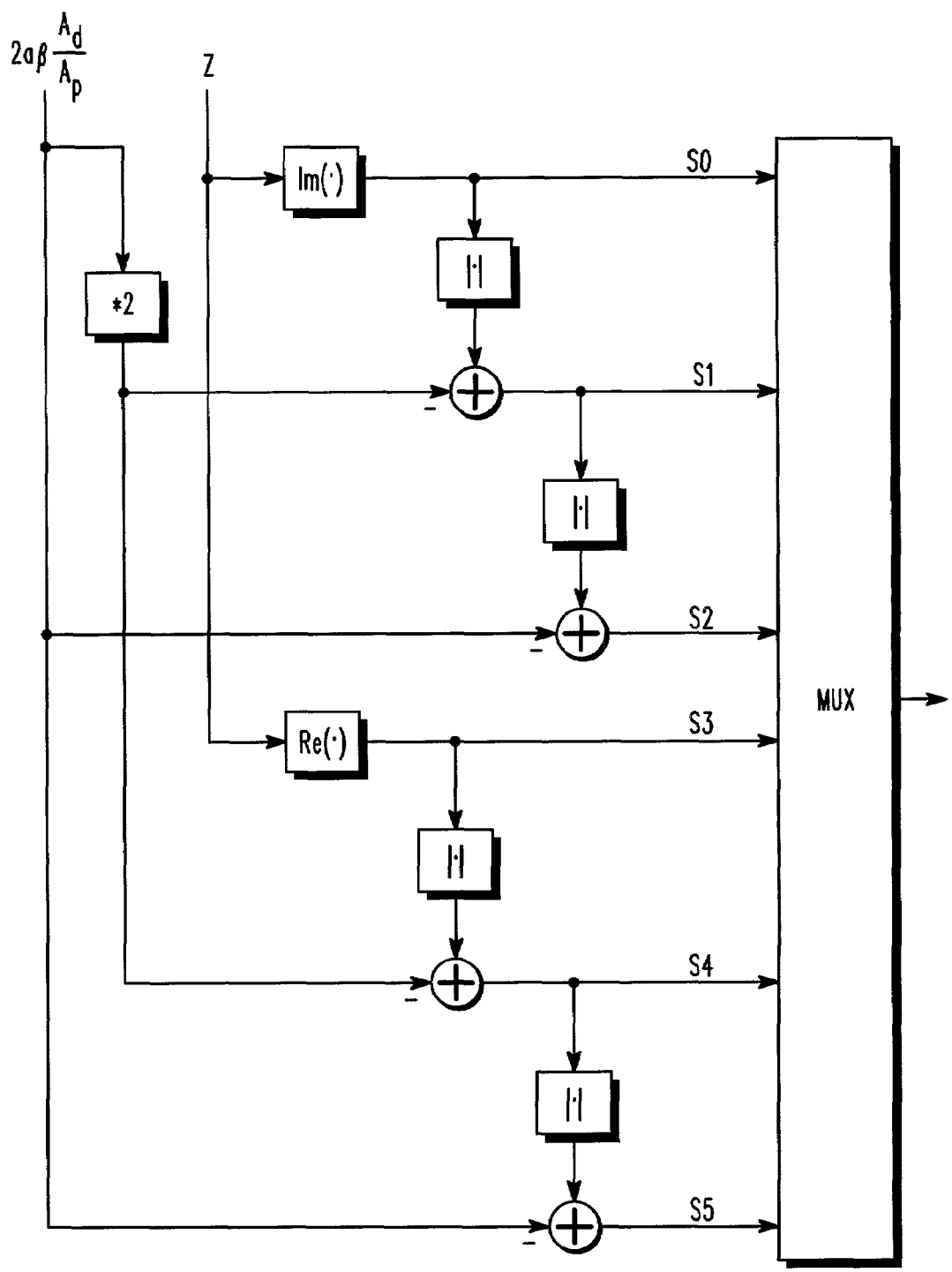
FIG. 10 shows a block diagram showing the simplified soft-decision metric generation for 64-QAM, in accordance with the present invention.
Figure 11:
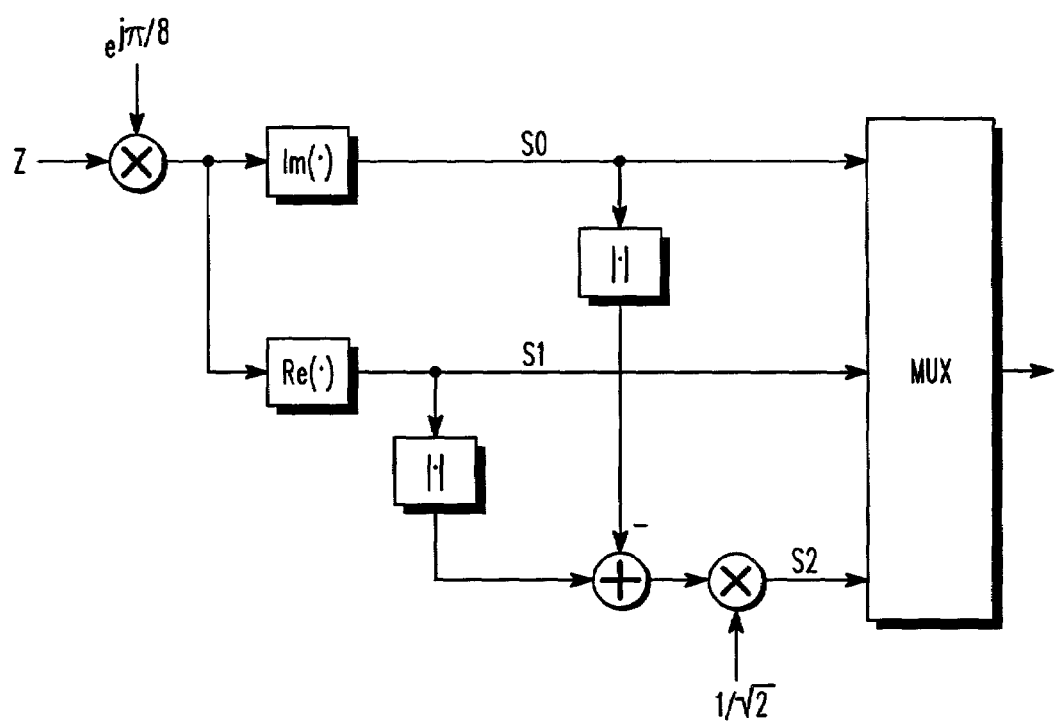
FIG. 11 shows a block diagram showing the simplified soft-decision metric generation for 8-PSK, in accordance with the present invention.

In contrast, for simplified soft-decision metric generation, no reference constellation is used. In this case, the receiver compensates for variations in signal amplitude by scaling the parameter a in the equations above by $\beta A_d/A_p$, as represented in FIG. 8. Once the receiver has compensated for the fading, the soft-decision metrics are calculated for the current modulation scheme as shown in the FIGS. 9–11. FIG. 9 shows the soft-decision metric for 16-QAM. FIG. 10 shows the soft-decision metric for 64-QAM. FIG. 11 shows the simplified soft-decision metric for 8-PSK, in accordance with the present invention.

Table 2 shows the number of operations required for dual-minima soft-decision metric generation compared to the number of operations required for simplified soft-decision metric generation in accordance with the present invention. For the dual-minima method, 2M multiplications are needed to scale the reference constellation by $\beta$, and 2M subtractions plus 2M multiply-accumulates are needed to calculate the squared Euclidean distance between the received signal and the scaled reference constellation. The $A_d/A_p$ factor can be included in the reference constellation, so it does not need to be accounted for here. Finally, for each of the log$_2$Mbits per symbol, 2*(M/2) compare-and-select operations are needed to calculate the two minima, and one subtraction is needed. Therefore, the dual-minima method requires a total of 6M+(M+1)log$_2$M operations per symbol.

In contrast, the operation counts for the simplified method in accordance with the present invention can easily be determined from the preceding FIGS. 9–11. Each real subtraction, absolute value, and multiplication is one operation, while the complex multiplication needed for 8-PSK is 4 operations. One additional operation is needed for 16-QAM and 64-QAM to scale the parameter $\alpha$ by $\beta$. The $A_d/A_p$ factor can be included in the value of $\alpha$, so it does not need to be accounted for here.

TABLE 2

Comparison of operation counts

| M | Dual-Mimima | Simplified |
|---|-------------|------------|
| 8 | 75 | 8 |
| 16 | 164 | 5 |
| 64 | 774 | 10 |

Figure 12:
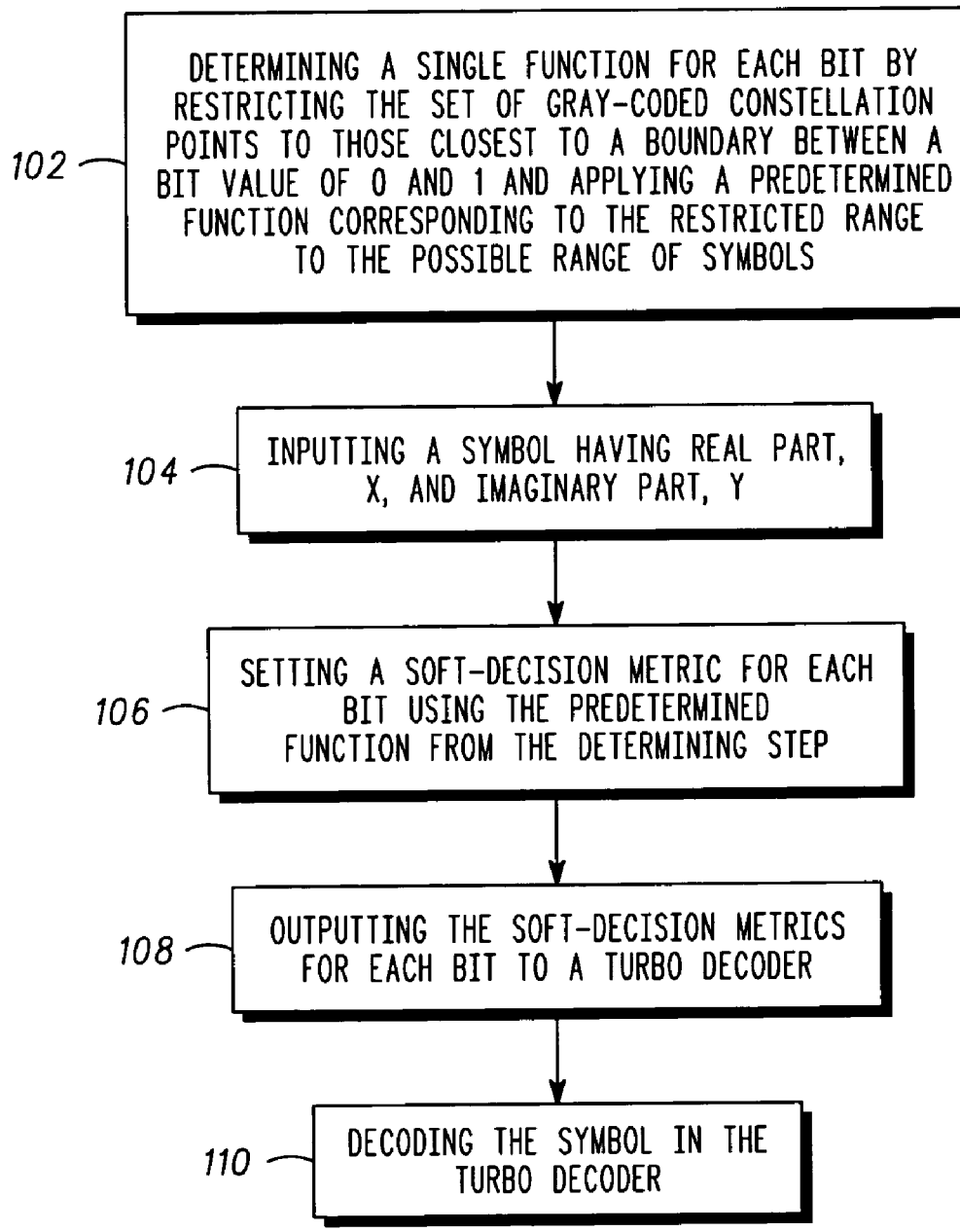
FIG. 12 shows a flow chart for a method of generating a simplified soft-decision metric, in accordance with the present invention.

FIG. 12 shows a flow chart representing a method 100 of reducing calculations in the decoding of a received convolutionally coded M-ary signal in a radio communication system, in accordance with the present invention. A first step is determining 102 a single function for a soft-decision metric for each bit in a symbol by restricting the set of all possible Gray-coded constellation points to those closest to a boundary between a bit value of 0 and 1 for each bit in the input symbol and applying a predetermined function corresponding to the range of restricted constellation points to the entire possible range of symbols. In particular, the predetermined function is defined by the difference between the squares of the distances between the restricted constellation points having 0 and 1 bit values and a hypothetical symbol falling within the range of restricted constellation points. A next step is inputting 104 a symbol having real part, x, and an imaginary part, y. A next step is setting 106 a soft-decision metric for each bit in the symbol using the predetermined function from the determining step. Preferably, the soft-decision metric is scaled. In particular, the soft-decision metric is scaled by a factor of $\beta A_d/A_p$, wherein $\beta$ is the squared magnitude of the filtered pilot signal, and $A_d$ and $A_p$ are the data and pilot signal gains, respectively. A next step is outputting 108 the soft-decision metrics for each bit of the symbol to a turbo decoder. A next step is decoding 110 the symbol in the turbo decoder. The above steps are repeated until all symbols to be input are decoded.

Figure 13:
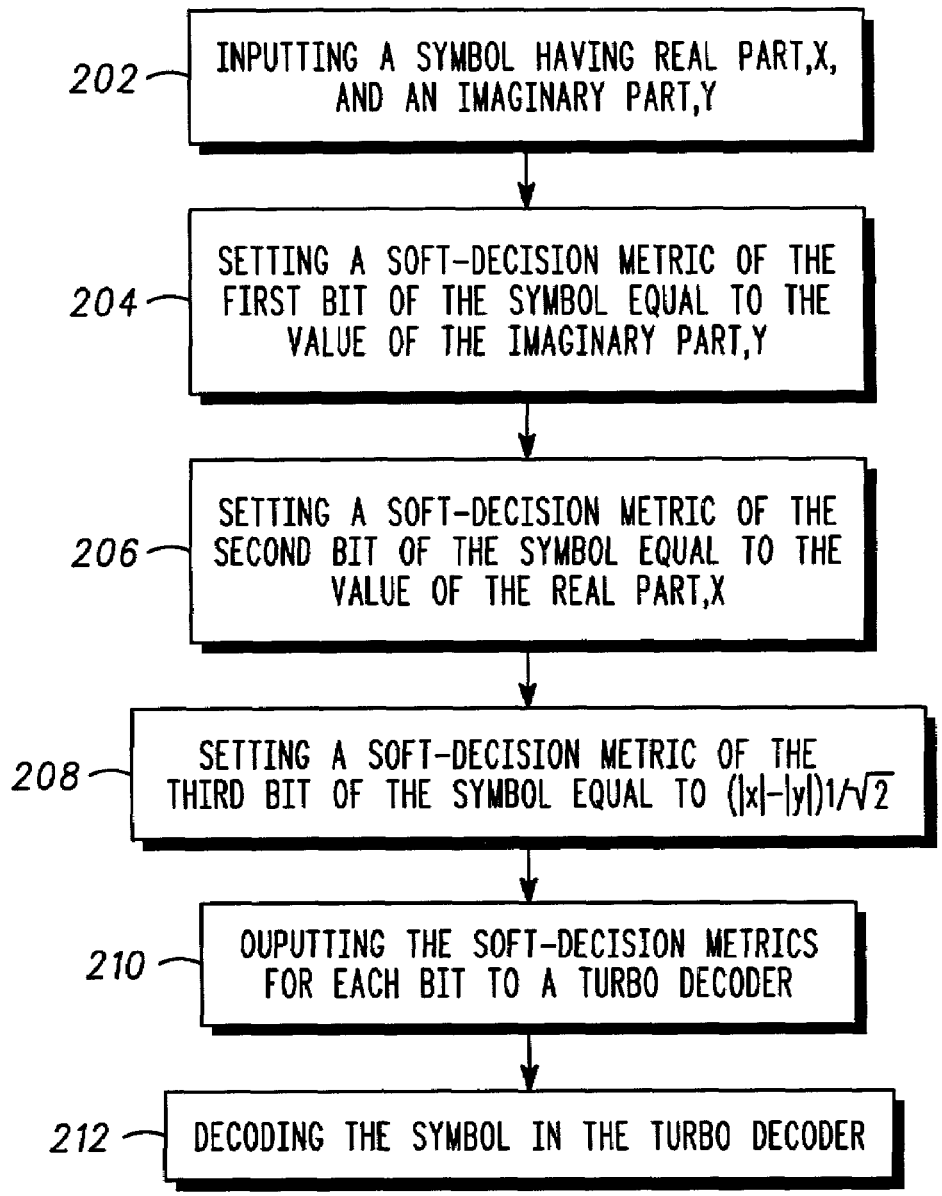
FIG. 13 shows a flow chart for a preferred method of generating a simplified soft-decision metric, in accordance with the present invention.

FIG. 13 shows a flow chart representing a preferred method 200 of reducing calculations in the decoding of a received convolutionally coded M-ary signal (such as a 8-PSK signal) represented by a constellation, in accordance with the present invention. A first step is inputting 202 a symbol having real part, x, and an imaginary part, y. Preferably, the symbol is includes phase shifted by $e^{j\pi/8}$. This step can optionally include scaling the soft-decision metrics by a factor of $\beta A_d/A_p$, wherein $\beta$ is the squared magnitude of the filtered pilot signal, and $A_d$ and $A_p$ are the data and pilot signal gains, respectively. However, scaling is not necessary in 8-PSK decoding as a radial constellation and boundary analysis is utilized, as opposed to an orthogonal constellation and analysis, wherein the scale of the constellation is irrelevant to the analysis. A next step includes setting 204 a soft-decision metric of the first bit of the symbol equal to the value of the imaginary part, y, of the symbol. A next step includes setting 206 a soft-decision metric of the second bit of the symbol equal to the value of the real part, x, of the symbol. A next step includes setting 108 a soft-decision metric of the third bit of the symbol equal to $$(|x|-|y|)\frac{1}{\sqrt{2}}.$$

A next step includes outputting 210 the soft-decision metrics for each bit of the symbol to a turbo decoder. A next step includes decoding 212 the symbol in the turbo decoder. The above steps are repeated until all symbols to be input are decoded.

In review, the present invention provides a decoder that reduces calculations in the decoding of a received M-ary convolutionally coded signal using the properties of Gray coding to generate simplified soft-decision metrics for each bit. The decoder includes a standard turbo decoder to subsequently decode the soft-decision metrics.

The key advantages of the present invention are easy software implementation with no hardware changes. Hardware implementation would be greatly simplified as well, requiring fewer gates and clock cycles.

While specific components and functions of the decoding of convolutional codes are described above, fewer or additional functions could be employed by one skilled in the art within the broad scope of the present invention. The invention should be limited only by the appended claims.

What is claimed is:

1. A method of reducing calculations in the decoding of a M-ary modulated convolutionally coded signal in a radio communication system, the method comprising the steps of:
   a) determining a single function for a soft-decision metric for each bit in a symbol by restricting a set of all possible Gray-coded constellation points to those closest to a boundary between a bit value of 0 and 1 for each bit in an input symbol and applying a predetermined function corresponding to a range of restricted constellation points to an entire possible range of symbols;
   b) inputting the symbol;
   c) setting the soft-decision metric for each bit in the symbol using the predetermined function from the determining step;
   d) outputting the soft-decision metric for each bit of the symbol to a turbo decoder;
   e) decoding the symbol in the turbo decoder; and
   f) repeating steps a) through e) until all symbols to be input are decoded.

2. The method of claim 1, wherein the setting step includes a substep of scaling the soft-decision metric.

3. The method of claim 2, wherein the scaling substep includes scaling the soft-decision metric by a factor of $\beta A_d/A_p$, wherein $\beta$ is the squared magnitude of a filtered pilot signal, and $A_d$ and $A_p$ are the data and pilot signal gains, respectively.

4. The method of claim 1, wherein the predetermined function of the determining step is defined by the difference between squares of the distances between the set of all possible Gray-coded restricted constellation points having 0 and 1 bit values and a hypothetical symbol falling within the range of restricted constellation points.

5. A method of reducing calculations in the decoding of an 8-PSK modulated convolutionally coded signal in a radio communication system, the method comprising the steps of:
   a) providing a set of eight possible Gray-coded symbols for the 8-PSK modulated convolutionally coded signal in a constellation;
   b) defining radial boundaries in the constellation;
   c) inputting a symbol;
   d) plotting the location of the symbol in the constellation;
   e) locating two nearest constellation points to the symbol having a 0 value and a 1 value for each bit;
   f) setting a soft-decision metric for each bit using the two nearest constellation points from the locating step;
   g) outputting the soft-decision metric for each bit of the symbol to a turbo decoder;
   h) decoding the symbol in the turbo decoder;
   i) repeating steps a) through h) until all symbols to be input are decoded;
   wherein the setting step further comprises the step of scaling the soft-decision metric, and
   wherein the scaling step includes scaling the soft-decision metric by a factor of $\beta A_d/A_p$, wherein $\beta$ is a squared magnitude of a filtered pilot signal, and $A_d$ and $A_p$, are data and pilot signal gains, respectively.

6. The method of claim 5, wherein the inputting step includes phase shifting the symbol by $e^{j\pi/8}$.

7. A method of reducing calculations in the decoding of an 8-PSK modulated convolutionally coded signal in a radio communication system, the method comprising the steps of:
   a) inputting a symbol having real part, x, and an imaginary part, y;
   b) setting a soft-decision metric of a first bit of the symbol equal to the value of the imaginary part, y, of the symbol;
   c) setting a soft-decision metric of a second bit of the symbol equal to the value of the real part, x, of the symbol;
   d) setting a soft-decision metric of a third bit of the symbol equal to $$(|x|-|y|)\frac{1}{\sqrt{2}}$$

e) outputting the soft-decision metrics of the first, second and third bits of the symbol to a turbo decoder;
   f) decoding the symbol in the turbo decoder, and
   g) repeating steps a) through t) until all symbols to be input are decoded.

8. The method of claim 7, wherein the inputting step includes phase shifting the symbol by $e^{j\pi/8}$.

* * * * *